United States Patent [19]

Rasshofer

[11] Patent Number: 4,740,531

[45] Date of Patent: Apr. 26, 1988

[54] POLYAMINOHYDROXYL COMPOUNDS CONTAINING URETHANE AND/OR UREA GROUPS AND PROCESSES FOR THEIR PREPARATION AND USE

[75] Inventor: Werner Rasshofer, Cologne, Fed. Rep. of Germany

[73] Assignee: Bayer Aktiengesellschaft, Leverkusen, Fed. Rep. of Germany

[21] Appl. No.: 76,980

[22] Filed: Jul. 23, 1987

[30] Foreign Application Priority Data

Aug. 7, 1986 [DE] Fed. Rep. of Germany ....... 3626661

[51] Int. Cl.$^4$ ............................................. C08G 18/14
[52] U.S. Cl. ..................................... 521/167; 528/76; 528/77; 528/79; 560/24; 560/25; 560/26; 560/115; 560/116; 560/117; 560/132; 560/133; 564/32; 564/38; 564/48; 564/55; 564/57; 264/51; 264/328.1; 264/328.2; 264/328.8
[58] Field of Search ..................... 521/167; 528/76, 77, 528/79; 564/32, 38, 48, 55, 57; 560/24, 25, 26, 115, 116, 117, 132, 133; 264/51, 328.1, 328.2, 328.8

[56] References Cited

U.S. PATENT DOCUMENTS

| | | | |
|---|---|---|---|
| 4,386,218 | 5/1983 | Rasshofer et al. | 564/38 |
| 4,501,873 | 2/1985 | Rasshofer | 528/48 |
| 4,588,840 | 5/1986 | Gurgiolo | 564/443 |

FOREIGN PATENT DOCUMENTS

| | | |
|---|---|---|
| 0079536 | 5/1983 | European Pat. Off. . |
| 0081701 | 6/1983 | European Pat. Off. . |
| 2948419 | 8/1981 | Fed. Rep. of Germany . |

OTHER PUBLICATIONS

Bayer-Polyurethane, Order No. PU–50025/ Bayer AG Leverkusen, Issue 1.79, D100–779/847990, pp. 139–179.

Primary Examiner—Maurice J. Welsh
Attorney, Agent, or Firm—Gene Harsh; Joseph C. Gil; Lyndanne M. Whalen

[57] ABSTRACT

Polyaminohydroxyl compounds having molecular weights of from 200 to 20,000 and a functionality greater than 1 but less than or equal to 8 containing 0.165–16.5 wt. % amino and hydroxyl groups and 0.295–29.5 wt. % urethane and/or urea groups are produced by hydrolyzing the corresponding NCO prepolymer containing OH groups. The equivalent ratio of amino groups to hydroxyl groups in these polyaminohydroxyl compounds is from 99:1 to 0.1:99.9. Groups which are inert with respect to amines and isocyanates may optionally be present in the polyaminohydroxyl compounds in quantities such that the equivalent ratio of amine groups to inert groups is from 100:0 to 33.$\bar{3}$:66.$\bar{6}$ and the equivalent ratio of hydroxyl groups to inert groups is from 100:0 to 33.$\bar{3}$:66.$\bar{6}$. These polyaminohydroxyl compounds are useful in the production of polyurethanes. The polyaminohydroxyl compounds in which the difference between the sum of amino groups plus hydroxyl groups plus inert groups and the sum of hydroxyl groups plus inert groups is 2±0.25 are particularly suitable for producing molded polyurethane articles by a RIM process.

28 Claims, No Drawings

POLYAMINOHYDROXYL COMPOUNDS CONTAINING URETHANE AND/OR UREA GROUPS AND PROCESSES FOR THEIR PREPARATION AND USE

BACKGROUND OF THE INVENTION

This invention relates to compounds containing primary amino groups attached to the molecular skeleton by urethane and/or urea groups and also hydroxyl groups and optionally isocyanate inert groups and processes for their preparation and use.

According to EP-B No. 81,701, elastic polyurethane molded products having a compact surface layer are obtained from polyethers with molecular weights of from 1800 to 12,000 in which the isocyanate reactive groups contain at least 50% primary and/or secondary amino end groups (and possibly also hydroxyl groups). The disclosed polyethers may be obtained by the pressure amination of polyether polyols or by the hydrogenation of adducts of acrylonitrile and polyether polyols or by the reaction of polyols with isatoic acid anhydride or by the hydrolysis of isocyanate compounds according to DE-A No. 2,948,419. The polyethers may also be mixed, for example, with polyether polyols to form a polyether mixture having the composition claimed. Suitable amino polyethers may also be obtained by partial pressure hydrogenation in the presence of ammonia. These aminopolyethers may contain, for example, 80 equivalent percent of amino groups and 20 equivalent percent of hydroxyl groups.

In accordance with U.S. Pat. No. 4,588,840, polyoxyalkylene-aryl polyamines may be obtained by reaction of polyoxyalkylene polyols with aromatic amines and hydrogen under pressure in the presence of catalysts containing nickel, cobalt, copper or manganese.

Amino compounds of this kind may also be obtained, for example, according to EP-A No. 0,050,275 by hydrolysis of the corresponding preliminary isocyanate stages (in particular isocyanate prepolymers). These compounds are a very suitable starting material for the preparation of polyurethane (urea) elastomers.

The higher molecular weight compounds which are particularly suitable for this purpose, however, have relatively high viscosities, e.g. in the region of 10,000 to 100,000 mPas/25° C., and are therefore very difficult to process. This high viscosity is due to the fact that the preferred starting compounds for the preparation of the preferred amino compounds are isocyanate prepolymers which are obtained by the reaction of polyols (preferably polyether polyols) with excess quantities of polyisocyanates and contain urethane groups. These isocyanate prepolymers have a substantially higher viscosity than the underlying polyether polyols (generally about twice the viscosity).

SUMMARY OF THE INVENTION

It is an object of the present invention to provide compounds at least as suitable as the compounds disclosed in EP-A No. 150,275 for production of polyurethanes (ureas) which compounds have a considerably lower viscosity than the known compounds.

It is also an object of the present invention to provide processes for making such polyaminohydroxyl compounds and for using them in the production of polyurethane (ureas).

These and other objects which will be apparent to those skilled in the art are accomplished by hydrolyzing isocyanates containing specified amounts of isocyanate, hydroxyl, urethane and/or urea groups to form the corresponding polyaminohydroxyl compounds. These compounds may then be reacted with polyisocyanates to form polyurethanes (ureas).

DETAILED DESCRIPTION OF THE INVENTION

The present invention relates to compounds containing urethane and/or urea groups and primary amino groups, and hydroxyl groups and optionally inert groups and having molecular weights of from 200 to 20,000, preferably higher molecular weight compounds in the molecular weight range of from 400 to 12,000 and most preferably within the molecular weight range of from to 7000, having a functionality from >1 to 8, preferably from 1.5 to 6 and most preferably from 2 to 4 which contain (a) amino and hydroxyl groups in quantities of from 0.165 to 16.5 wt. %, preferably 0.3 to 10 wt. %, most preferably 0.4 to 5 wt. %, with the equivalent ratio of amino groups to hydroxyl groups being in the range of from 99:1 to 0.1:99.9, preferably from 95:5 to 5:95, more preferably from 80:20 to 20:80, and most preferably from $66.\overline{6}:33.\overline{3}$ to $33.\overline{3}:66.\overline{6}$, (b) optionally amino inert and isocyanate inert end groups ("inert groups") in quantities such that the equivalent ratio of amino groups to the optionally present inert groups is in the range of from 100:0 to $33.\overline{3}:66.\overline{6}$, preferably from 100:0 to 80:20, most preferably from 100:0 to 90:10 and that the equivalent ratio of the hydroxyl groups to the inert groups lies in the range of from 100:0 to $33.\overline{3}:66.\overline{6}$, preferably from 100:0 to 80:20, most preferably from 100:0 to 90:10, and (c) urethane and/or urea groups preferably in quantities of from 0.295 to 29.5 wt. %.

The equivalent ratio of amino groups to the sum of hydroxyl groups and optional inert groups lies in the range of from 1:99 to 99.9:1, preferably from 5:95 to 95:5, more preferably from 20:80 to 80:20 and most preferably from $33.\overline{3}:66.\overline{6}$ to $66.\overline{6}:33.\overline{3}$.

The presence of inert groups may be obtained in particular by a simple reaction of the OH and/or amino groups with monofunctionally reacting compounds accompanied by partial "blocking" of the functional groups of polyvalent compounds such as triols or tetrols (e.g., by acylation or by reaction with monoisocyanates or by methoxylation or esterification with inorganic monofuactional acids). This "blocking" of the functional groups is preferably carried out before the reaction with the di- or polyisocyanates to form hydroxyl-containing isocyanate prepolymers.

This invention further relates to coapounds in the molecular weight range of from 200 to 20,000, preferably relatively high molecular weight compounds in the range of from 400 to 12,000, most preferably from 1000 to 7000, with an average functionality of from >1 to 8, preferably from 1.5 to 6, most preferably from 2 to 4, having a hydroxyl plus amino group content of from 16.5 to 0.165 wt. %, a urethane group (NHCOO) and/or urea group (NHCONH) content of from 29.5 to 0.295 wt. %, and an equivalent ratio of $NH_2$ groups to OH groups in the range of from 99:1 to 0.1:99.9, preferably from 80:20 to 20:80, most preferably from $66.\overline{6}:33.\overline{3}$ to $33.\overline{3}:66.\overline{6}$.

The invention relates preferentially to compounds containing urethane and urea groups carrying primary amino groups, hydroxyl groups and optionally inert groups in accordance with the above definition which further contain polyether groups. Particularly preferred compounds correspond to formula (I)

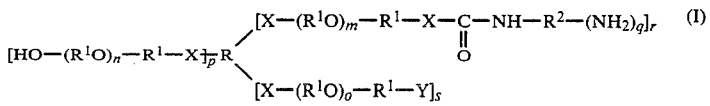

in which

X represents NH or O,

Y represents H, a monovalent organic group (e.g. an alkyl, aryl or alkoxy group) or preferably a [—O—CONH-monovalent group] or a [—NHCONH-monovalent group] (the monovalent group being e.g. alkyl, aryl or alkoxy), R represents a group obtained by the removal of (p+r+s) XH groups from a (p+r+s)-valent polyamine, polyalcohol or amino alcohol, $R^1$ represents an optionally alkyl- or aryl-substituted $C_2$-$C_4$-alkylene group, in particular an ethylene and/or 1,2-propylene group, $R^2$ represents a (q+1)-valent group as obtained by the removal of (q+1) NCO groups from a (q+1)-valent polyisocyanate, q has a value of from 1 to 2, n, m, o are so chosen that the molecular weight is in the range of from 200 to 20,000, preferably 400 to 12,000, and p, r, s are so chosen that (p+r+s)=2 to 8, preferably 2 to 6, most preferably 2 to 4, and p:s=100:0 to 33.$\overline{3}$:66.$\overline{6}$, preferably 100:0 to 80:20, most preferably 99.1:0.1 to 90:10, r:p=99:1 to 0.1:99.9, preferably 95:5 to 5.95, more preferably 80:20 to 20:80 and most preferably 66.$\overline{6}$:33.$\overline{3}$ to 33.$\overline{3}$:66.$\overline{6}$, and r:s=100:0 to 33.$\overline{3}$:66.$\overline{6}$, preferably 100:0 to 80:20, most preferably 99.9:0.1 to 90:10.

The compounds of the present invention in which the sum of the equivalents of primary amino groups, OH groups and optional inert groups minus the sum of the equivalents of OH groups+optional inert groups has a value of 2±0.25, preferably about 2±0.1, are most preferred. In the case of polyether compounds corresponding to formula (I), this means that the values of (r+s+p) minus (p+s) result in a value of 2±0.25, preferably 2±0.1.

The present invention also relates to mixtures made up of (a) 75–100 wt. % of the polyaminohydroxyl compound(s) of the present invention, particularly the polyether compounds corresponding to formula (I) as defined above, (b) 0 to 5 wt. % of compounds corresponding to formula (II) or low molecular weight or relatively high molecular weight secondary products of those compounds corresponding to formula (II) (resulting from hydrolysis of the free polyisocyanates used for the preparation of the compounds corresponding to formula (I) and still present (in minor quantities) in addition to the isocyanate prepolymers containing OH groups and optionally inert groups)

$$R^2(NH_2)_{q+1} \quad (II),$$

and (c) 0 to 20 wt. % starting compounds (polyols or aminopolyols optionally containing inert groups, in particular polyether compounds (III) corresponding to the starting compounds from which the polyaminohydroxyl compound (a) was produced, preferably starting compounds containing inert groups and obtained by the modification of polyols or aminopolyols (compound (IV), X=O; compound (IV), X=NH). The preferred polyethers (c) are represented by the formula

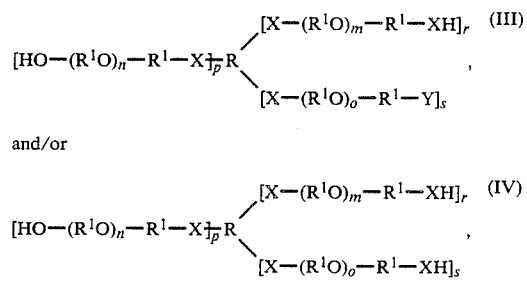

and/or in which X, R, $R^1$, $R^2$, n, m, o, p, q, r, s and Y have the meanings defined above.

The present invention also relates to a process for the preparation of the above-mentioned, new compounds. In this process isocyanate compounds which contain urethane and/or urea groups and in addition contain hydroxyl groups and optionally NCO-inert groups and have a functionality of from <1 to 8, preferably from 1.5 to 6, in particular 2 to 4, which compounds contain from 0.3 to 25.9 wt. %, preferably from 0.4 to 15 wt. %, in particular from 1 to 13 wt. % of free isocyanate groups and contain hydroxyl groups and optionally isocyanate inert groups as well as urethane and/or urea groups, preferably from 0.295 to 29.5 wt. % urethane and/or urea groups, in which the ratio of isocyanate groups to hydroxyl groups is in the range of from 90:1 to 0.1:99.9, preferably from 95:5 to 5:95, more preferably from 80:20 to 20:80, most preferably from 66.$\overline{6}$:33.$\overline{3}$ to 33.$\overline{3}$:66.$\overline{6}$, and the ratio of isocyanate groups to inert groups is from 100:0 to 33.$\overline{3}$:66.$\overline{6}$, preferably from 100:0 to 80:20, most preferably from 100:0 to 90:10, and the ratio of hydroxyl groups to inert groups is from 100:0 to 33.$\overline{3}$:66.$\overline{6}$, preferably from 100:0 to 80:20, most preferably from 100:0 to 90:10 are hydrolyzed. These isocyanates are hydrolyzed to form the compounds of the present invention with at least 0.75 mol of water per NCO group, preferably with more than 1 mol of water per NCO group. The hydrolysis may be carried out in the presence of catalysts based on basic compounds, tertiary amines or metal catalysts (preferably basic compounds) and optionally in the presence of solvents, with or without isolation of an intermediate stage. The polyaminohydroxyl compounds obtained may be isolated, e.g. by phase separation or extraction, optionally after the usual methods of purification.

In one preferred embodiment of the process of the present invention, the isocyanate starting material containing hydroxyl groups is mixed with water and a base to be converted into a reaction mixture containing compounds carrying carbamate groups. The compounds of the present invention may be recovered from this reaction mixture by decomposition of the compounds containing carbamate groups by a heat treatment at temperatures from room temperature to 200° C. and/or by treatment with an acid and/or by extraction with an organic solvent.

In another preferred embodiment of the process, the isocyanate containing NCO and OH groups is directly hydrolyzed with water in a substantially homogeneous phase at a temperature in the region of 25° C. to 210° C. in the presence of a basic catalyst and in the presence of an at least partly water-miscible, preferably aprotic-dipolar solvent such as dimethylformamide.

This invention also relates to the use of the new compounds as starting compounds for the production of foamed or unfoamed polyurethane polyureas, in particular for the production of molded elastomeric polyurethane-polyurea products having a surface skin (for the motor car industry) by the RIM process using closed molds.

DE-A No. 3,244,913 discloses relatively high molecular weight aromatic polyamines optionally containing residues of low molecular weight compounds carrying isocyanate reactive end groups, e.g. OH groups, which polyamines are prepared by a one-shot process (without previous formation of an isocyanate prepolymer) carried out at temperatures of from −20° C. to 175° C., in which polyisocyanates, relatively high molecular weight polyols with molecular weights of from 400 to 10,000 and optionally low molecular weight polyols in the molecular weight range of from 62 to 399 are simultaneously mixed in certain proportions in the presence of excess quantities of water, optionally in the presence of water-miscible solvents and optionally in the presence of catalysts. The mixture is heated if necessary and the amine product is then separated.

The compounds of the present invention are preferably relatively low viscosity compounds but may be medium to high viscosity compounds or even solid or crystalline compounds with a high melting point if they have been prepared from very short-chained starting materials. They contain amino groups and hydroxyl groups and may also contain isocyanate inert end groups. These compounds are prepared by hydrolysis of previously formed corresponding isocyanate compounds containing terminal isocyanate groups, hydroxyl groups and optionally inert groups. These previously formed isocyanate compounds may be obtained by the (partial) reaction of di- and/or polyisocyanates with polyols or aminopolyols in the molecular weight range of from 62 to 10,000 to form so-called isocyanate prepolymers still containing specified quantities of hydroxyl groups.

The compounds of the present invention are advantageous compared with the compounds prepared according to DE-A No. 3,244,913 because they contain fewer free, low molecular weight di- and/or polyamines (from the di- or polyisocyanates) and a smaller quantity of polyol starting materials (which have not yet reacted with the polyisocyanates in the simultaneous reaction) and have a more clearly defined structure as a whole and yet a relatively low viscosity (compared with the given starting materials).

The isocyanate compounds to be used in the process of the present invention are isocyanate prepolymers obtained in a known manner by the reaction of low molecular weight (molecular weight 62 to 399) and/or relatively high molecular weight compounds (molecular weight 400 to about 12,000) containing hydroxyl and optionally amino and optionally thiol groups as reactive groups with polyisocyanates. However, in this reaction, the formation of isocyanate prepolymer is stopped before all of the OH, SH and/or $NH_2$ groups have reacted and the incompletely reacted isocyanate prepolymers obtained are then hydrolyzed to convert their isocyanate groups into amino groups.

The polyisocyanates used for the preparation of the compounds containing free isocyanate groups may in principle be any aromatic, aliphatic (including cycloaliphatic or araliphatic) or heterocyclic polyisocyanates (including diisocyanates) of the kind which are described, for example, by W. Siefken in Justus Liebigs Annalen der Chemie, 562, pages 75 to 136, and pages 12 to 23 of DE-A No. 3,223,397. Low molecular weight and/or relatively high molecular weight compounds suitable for these reactions, which contain hydroxyl and/or amino and/or thiol groups as reactive groups and have molecular weights in the range of 32 to 12,000 are also disclosed in DE-A No. 3,223,397. Di- and/or polyisocyanates having an average isocyanate functionality of from 2 to 3 are preferred.

Aromatic di-/polyisocyanates are particularly preferred, especially 2,4- and/or 2,6-toluylene diisocyanates and 4,4'- and/or 2,4'-diisocyanatodiphenylmethanes, in particular 2,4-toluylene diisocyanate.

Examples of modified polyisocyanates suitable for the preparation of urethane- and/or urea-modified prepolymers include polyisocyanates containing urethane groups (obtained by modification with low molecular weight polyols), polyisocyanates containing urea groups (modification with water, DE-C No. 1,230,778), polyisocyanates containing biuret groups (U.S. Pat. Nos.3,124,605, 3,201,372, GB-A No. 889,050), polyisocyanates containing isocyanurate groups (DE-C Nos. 1,022,789 and 1,222,067) and dimeric and oligomeric polyisocyanates containing uretdione or uretoneimine groups. These compounds are known or obtainable by known methods. Numerous uretdione polyisocyanates are mentioned in "Analytical Chemistry of the Polyurethanes" Volume 16/III High-Polymers-Series (Wiley 1969). Such modified polyisocyanates containing urethane and/or urea and/or biuret and/or uretdione and/or isocyanurate and/or uretone-imine groups suitable for the preparation of the NCO- and OH-containing isocyanate component used in the process of the present invention normally have an isocyanate content of from 5 to 40 wt. %, preferably 10 to 25 wt %.

The low molecular weight and/or relatively high molecular weight, polyfunctional compounds in the molecular weight of 32 and in the range of 60 to 20,000 containing hydroxyl and/or amino and/or thiol groups which are to be reacted with the polyisocyanates to prepare the isocyanate prepolymer containing NCO and OH groups and urethane and/or urea groups may still contain end groups which are inert in isocyanate addition reactions. These inert end groups are preferably introduced by the conversion of a certain proportion of the hydroxyl and/or amino and/or thiol groups into inert groups by known methods which may be found in literature. These methods include, for example, the conversion of OH groups in the starting polyol into ether groups (e.g. with dimethylsulphate), into urethane groups (with monoisocyanates) or into halide groups (with halogenating agents). The amino groups may be converted into ureas with monoisocyanates or into azomethine groups with ketones. The inert groups are preferably introduced before the reaction with the di-/poly- isocyanates. The preferred reactants for introduction of inert groups are monoisocyanates.

The compounds containing hydroxyl and/or amino groups and optionally inert groups (in the context of isocyanate addition reactions) are converted into the prepolymer reaction component by reaction with a polyisocyanate. In this process, the isocyanate reactive groups (e.g. OH groups) are only partially reacted with the isocyanate groups of the polyisocyanates, and the isocyanate groups are hydrolyzed to form primary amino groups before they have completely reacted with the OH and amino groups (or also thiol groups).

The isocyanate prepolymers used in the process of the present invention are preferably the type obtained from relatively high molecular weight, difunctional or higher functional polyols (molecular weight 400 to 12,000), preferably polyether polyols, optionally in the presence of chain-lengthening agents of the type described above (molecular weights preferably 60 to 399) by incomplete isocyanate prepolymer formation with aromatic di- and/or polyisocyanates (preferably diisocyanates). As already mentioned, not all the hydroxyl groups react with the polyisocyanates. For the desired reaction of one hydroxyl group equivalent, it is preferable to use one mol of a diisocyanate so that the hydroxyl group is converted into an NCO-containing end group attached through a urethane group:

—OH+OCN—D—NCO→—OCO—N-H—D—NCO (D=residue of a diisocyanate).

The isocyanate content of the isocyanate prepolymer which contains NCO and OH groups and optionally NCO-inert end groups used in the process of the present invention is about 0.1 to 25.9 wt. %, preferably 0.3 to 20 wt. %, most preferably 0.5 to 12 wt. % NCO.

Particularly preferred prepolymers are those which have been prepared from toluylene diisocyanates or diphenylmethanediisocyanates and polyhydroxyl compounds in quantities such that 33.3̄ to 99.9̄, preferably 50 to 85, more preferably 50 to 66.6̄ equivalent percent of the hydroxyl groups (in the NCO/OH ratio 2:1) undergo reaction. Use of such quantities results in arithmetically half of the NCO groups put into the reaction remaining free and 66.6̄ to 0.1 equivalent percent, preferably 50 to 15, most preferably 50 to 33.3̄ equivalent percent of the hydroxyl groups originally present remaining free.

For example, 1 mol of diol HO—I—OH is reacted with 1 mol of diisocyanate OCN—D—NCO until 50% of the OH groups have reacted with the (total) quantity of diisocyanate groups (i.e. in an OH/NCO ratio of 1:2, based on the total quantity of hydroxyl groups) and 50% OH groups remain. This reaction may be represented by the equation:

HO—I—OH + OCN—D—NCO⟶     (1)
(1 mol)    (1 mol)

HO—I—OCONH—D—NCO

It is preferred to react 1 mol of triol

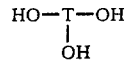

with 2 mol of diisocyanate so that 66.6% of the OH groups react with the (total) quantity of diisocyanate (i.e. at an OH/NCO ratio of 1:2) and 33.3% of the OH groups remain. This reaction may be represented by the following equation:

$$HO-T-OH + 2\ OCN-D-NCO\longrightarrow \quad (2)$$
$$\quad |$$
$$\quad OH$$

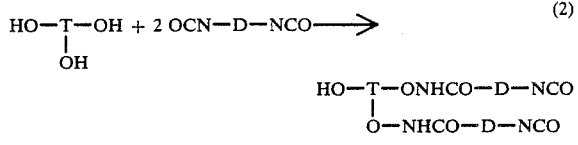

The formulae given above are idealized formulae but compounds corresponding to these idealized formulae predominate in the mixture of possible reaction products. Relatively uniform compounds containing amino/hydroxyl groups are therefore obtainable (after hydrolysis), in contrast to the products of the one-shot/simultaneous process of DE-A No. 3,244,913.

Isocyanate prepolymer formation may be stopped at the desired stage by monitoring the isocyanate content. If the OH/NCO reaction were allowed to go to completion, the product obtained in the first equation (diol+diisocyanate) would be a high polymer polyurethane, in the second equation an isocyanate prepolymer (with relatively low isocyanate content) and in the third equation (below) an OH prepolymer.

If 1 mol of the triol

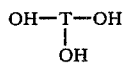

reacted with 1 mol of diisocyanate until 33 equivalent percent of the OH groups have reacted with the (total) quantity of diisocyanate (i.e. in the particular OH/NCO ratio of 1:2), then 66.6% of the OH groups are still free.

$$OH-T-OH + OCN-D-NCO\longrightarrow \quad (3)$$
$$\quad |$$
$$\quad OH$$

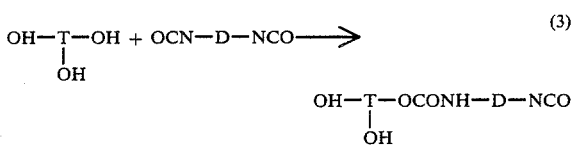

The polyhydroxyl compounds, e.g. a triol T (OH)$_3$, could have part of their hydroxyl groups converted into isocyanate inert groups prior to their reaction with di- and/or polyisocyanates. For example, such polyhydroxyl compounds may be reacted with monoisocyanates R′′′—NCO (R′′′=organic residue) to convert them to a compound of the type corresponding to the formula

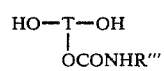

(T=trifunctional residue of the triol without OH groups)

which is then subjected to the isocyanate prepolymerization reaction of the present invention to form the NCO/OH prepolymer.

Such modification to form NCO inert groups could be carried out to only a minor extent, i.e. with only a proportion of the molecules. Modification to include inert groups reduces the functionality of the compound, often resulting in a reduction in viscosity of the amino-/OH compound mixtures of the present invention. A softening effect and modification of the properties of polymers used for the production of polyurethane ureas by a polyisocyanate polyaddition process (in particular resulting in improved plasticity and a less rigid molecular structure and combination of properties) are thus achieved.

It is also preferred for purposes of reaction kinetic to prepare the prepolymer component from polyhydroxyl-polyamine compounds of the kind obtainable by partial replacement of the hydroxyl groups in polyhydroxyl compounds by primary, aliphatically bound amino groups by means of so-called "ammonia suppression of the polyols" rather than polyhydroxyl compounds. Formation of the prepolymer from such aminopolyols is preferably carried out under reaction conditions such that all of the amino groups react with the diisocyanate(s) in proportions of $NCO:NH_2=2:1$ so that arithmetically half the NCO groups put into the process remain free and preferably most of the hydroxyl groups remain unreacted. This can be achieved relatively easily since hydroxyl groups react much more slowly than amino groups. It is possible to take advantage of a certain differential reactivity in polyols by using more rapidly reacting primary hydroxyl groups or more slowly reacting secondary hydroxyl groups in the polyols.

The prepolymer containing NCO and OH groups required for preparation of the amine compounds of the present invention may be obtained by reaction of polyisocyanates with compounds containing hydroxyl groups and optionally amino groups and optionally isocyanate inert groups. This reaction is carried out by combining the polyisocyanates with the isocyanate reactive components and preferably stirring. The reaction is generally carried out at temperatures of 20° C. to 120° C. but may be carried out at a lower temperature, if for example, the amine starting components are highly reactive and readily undergo cross-linking (e.g. aminopolyols containing aliphatically bound primary or secondary amino groups). A preferred temperature range for the polyhydroxyl compounds is from 25° C. to 80° C., particularly from 40° C. to 70° C. The reaction time depends upon the reactivities of the components, the reaction temperature, the desired isocyanate content, the desired isocyanate monomer content, the absence or presence of catalysts, etc. The reaction times required for polyols or aminopolyols containing aromatic amino groups are generally from 30 minutes to 12 hours, preferably 1 from to 12 hours, most preferably 2 to 5 hours. For aminopolyols containing aliphatic amino groups, very much shorter reaction times may be sufficient (e.g. 1 to 30 minutes) at room temperature.

The prepolymers obtained contain both OH groups and NCO groups. They are therefore capable of further reaction and should be worked up rapidly. The degree of urgency for the rapid use of these prepolymers depends upon their reactivity. The progress of the prepolymer forming reaction should be continuously monitored by suitable methods such as NCO titration or infra-red measurement of the NCO content. It is often advisable to take measures immediately after termination of the reaction to ensure the stability of the prepolymers containing NCO and OH groups. These measures may include: lowering of the temperature of the prepolymer after the reaction; the use of starting compounds differing substantially in the reactivity of their isocyanate reactive groups (e.g. polyethers containing (more highly reactive) primary and (less reactive) secondary hydroxyl groups or polyether aminopolyols in which the aliphatic amino groups undergo virtually selective reaction); or stabilization of the prepolymers with a substance known in the art for this purpose (acids, acid chlorides, etc.). Immediate treatment of the isocyanate prepolymer to hydrolyze it to the amine compound is, however, generally desirable even when such stabilizing maasures are taken.

The prepolymer compound containing NCO and hydroxyl groups is converted into the compound of the present invention containing amino and hydroxyl groups by hydrolysis with water optionally in the presence of hydrolyzing catalysts and optionally solvents.

The quantity of water used to hydrolyze the isocyanate groups into primary amino groups, based on one equivalent of isocyanate groups is 0.75 mol of water, preferably 0.75 to 50 mol of water, more preferably 1 to 35 mol of water and most preferably 1.25 to 12 mol of water.

The hydrolyzing catalysts may be inorganic or organic basic compounds and may be soluble or insoluble. Examples of suitable hydrolyzing catalysts include: hydroxides of elements of the 1st, 2nd and 3rd Main Groups and oxides of the 1st and 2nd Main Group of the Periodic Table of Elements, in particular hydroxides of the 1st and 2nd Main Groups, such as sodium and potassium hydroxide; carbonates and bicarbonates, preferably of metals of the 1st Main Group, such as sodium and potassium bicarbonate or soda and potash; carboxylates, preferably of monobasic carboxylic acids (such as formic, acetic or ethylhexanoic acid) with metals of the 1st and 2nd Main Groups of the Periodic Table of Elements, in particular of the 1st Main Group, such as potassium acetate, potassium octoate or potassium ethyl hexanoate; carbonates, bicarbonates and carboxylates of organic trialkylammonium salts; carbonates, bicarbonates, carboxylates and hydroxides of organic tetraalkylammonium-($C_1$-$C_{18}$-alkyl) groups; any alkali metal and alkaline earth metal salts of weak acids such as silicic acid, hydrocyanic acid, cyanic acid, thiocyanic acid, isocyanic acid, isothiocyanic acid and hydrogen sulphide which are strongly basic in reaction due to hydrolysis in water. Water-soluble alkali metal salts derived from acids such as ethylene diaminotetracetic acid, nitrilotriacetic acid, cyclohexylene tetracetic acid, hydroxyethylethylenediaminotriacetic acid, 2-hydroxy-1,3-diaminopropylenetetracetic acid, diethylenetriaminopentacetic acid, cyclamotetracetic acid, etc. and aminoproprionocarboxylic acid salts of the type mentioned in DE-A No. 2,451,013, such as the potassium salt of morpholine-N-propionic acid and dipotassium salts of piperazine-N,N'-dipropionic acid and N-cyclohexylnitrilodipropionic acid are also suitable catalysts. The alkali metal salts of mercaptans such as sodium N-butylmercaptide, lithium decylmercaptide, lithium 2-ethyl-6-hydroxyethylmercaptide, sodium carboxymethylmercaptide, potassium phenylmercaptide and the potassium salt of 2-aminothiophenol as well as other mercaptides mentioned in DE-A No. 2,314,865 may also be used.

Tertiary amines may also be used as basic catalysts according to the invention. Those having an aliphatic or cycloaliphatic structure are preferred and mixtures of various tertiary amines may also be used. Examples include amines which are in most cases not completely soluble in water; trialkylamines such as trimethylamine, triethylamine, tripropylamine, triisopropylamine, dimethyl-n-propylamine, tri-n-butylamine, triisobutylamine, triisopentylamine, dimethylbutylamine, triamylamine, dioctylhexylamine, dodecyldimethylamine, dimethylcyclohexylamine, dibutylcyclohexylamine, dicyclohexylethylamine and tetramethyl-1,3-butanediamine and tertiary amines containing an araliphatic group, e.g. dimethylbenzylamine, diethylbenzylamine and α-methylbenzyl-dimethylamine are suitable.

Trialkylamines containing a total of 6 to 15 carbon atoms, e.g. triethylamine to triamylamine or dimethylcyclohexylamine are preferred.

Aside from the trialkylamines, tertiary amines which have an additional tertiary amino group or an ether group, especially in the β-position to the tertiary group may also be used. Examples include: dialkylaminoalkyl ethers and bis-dialkyaminoalkylethers (U.S. Pat. No. 3,330,782, DE-B No. 1,030,558) such as dimethyl-(2-ethoxyethyl)-amine, diethyl-(2-methoxypropyl)-amine, bis-(2-dimethylaminoethyl)-ether, bis-(2-diethylaminoethyl)-ether, bis-(2-diethylaminoethyl)-ether, bis-(2-diethylamineisopropyl)-ether, 1-ethoxy-2-dimethylaminoethoxyethane, N-methyl-morpholine, N-ethylmorpholine and N-butylmorpholine; permethylated polyalkylenediamines such as tetramethylethylenediamine, tetramethyl-1,2-propylenediamine, pentamethyldiethylenetriamine, hexamethyltriethylenetetramine and higher permethylated homologs (DE-A Nos. 2,264,527 and 2,264,528); diethylaminoethylpiperidine, 1,4-diaza-(2,2,2)-bicyclooctane, N,N'-dimethylpiperazine, N-methyl-N'-dimethylaminoethylpiperazine, N,N'-bis-dimethylaminoethylpiperazine, etc; bis-dialkylaminoalkylpiperazines (disclosed in DE-A No. 2,636,787); N-dialkylaminoethylmorpholines (disclosed in EP-A No. 54,219); 4-dialkylaminopyridine and 4-pyrrolidinopyridine such as those disclosed in Angew. Chem., 90, 602 (1978); and the dialkylaminoalkyloxyazolidines disclosed in DE-A No. 3,033,832.

Preferred compounds from this group are water-soluble compounds such as tetramethylethylenediamine, permethylated diethylene triamine, N-methylmorpholine, 2-(2-dimethylaminoethyl)-ether and N-methylpiperidine.

The following are also suitable hydrolysis catalysts: tertiary amino compounds containing urea groups such as these disclosed in DE-A No. 3,027,796; the acylated tertiary amino compounds disclosed in DE-A Nos. 2,425,448, 2,523,663 and 2,732,292: the perhydrotriazines containing tertiary amino groups disclosed in DE-A No. 2,422,335; the tetramethylguanidine and 1,3-bis-(dialkylaminoalkyl)-guanidines disclosed in EP No. 33,879 (DE-A No. 3,003,978); the penta-substituted guanidines disclosed in CA-A No. 918,675; the catalysts containing guanidine groups disclosed in DE-A No. 3,018,023; the tetrahydropyrimidines disclosed in DE-B No. 2,439,550 and JP-B No. 71 02 672; the substituted cyclic and acyclic amidines disclosed in DE-A No. 1,950,262; the cyclic amidines disclosed in DE-B No. 1,745,418 (U.S. Pat. No. 3,769,244), U.S. Pat. No. 3,814,707 and DE-A No. 3,041,834; and the cyclic propionitriles disclosed in DE-A No. 2,419,304.

It is preferred to use tertiary amines which have a marked hydrolytic stability which may be recovered unchanged and which are water-soluble and/or boil at temperatures below 200° C. at normal pressure. The hydrolytic stability and/or solubility in water is often improved if the amine compound is present in the salt form. The salts of these amines with weak acids (such as carbonic acid) may also be used in the process of the present invention if these salts are stable. The salts of oleic acid or ricinoleic acid may also be used. Azacrown ethers and cryptands containing tertiary amine nitrogen atoms may also be used as tertiary amines in the process of the present invention but, are less preferred due to their cost.

In addition to the above-described catalysts, the reaction components for the process of the present invention may include metal compounds which act as Lewis acids known in polyurethane chemistry as urethanization catalysts. These include the known lead, zinc and tin compounds, in particular tin compounds and especially those tin compounds which are hydrolytically stable such as the catalysts described in EP-A No. 45,090, DE-A Nos. 2,657,413, 2,547,526 and 2,722,658.

Other catalytically active compounds suitable for the process of the present invention are described in DE-B No. 2,759,398, column 6, line 52 to column 7, line 54, and in Kunststoffe-Handbuch, Volume VII, published by Vieweg and Höchtlen, Carl-Hanser-Verlag, Munich 1966, e.g. on pages 96 to 102.

Insoluble catalysts such as those of the zeolite or bentonite type disclosed in EP-A No. 99,537 (U.S. Pat. No. 4,525,534) may also be used.

Solvents useful in the process of hydrolysis should be at least partly miscible with water and may be selected from the following classes of solvents: water-soluble, aliphatic or cycloaliphatic acid amides containing 1 to 10 carbon atoms such as dimethylformamide (DMF), diethylformamide, N-methylpyrrolidone, dimethylacetamide, caprolactam and formamide with dimethylformamide, dimethylacetamide and N-methylpyrrolidone being preferred (especially DMF); water-soluble ethers of ethylene glycol (e.g. ethylene glycol dimethylether and ethylene glycol diethylether), of diethyleneglycol, (e.g. diethylene glycol dimethylether and diethylene glycol monomethyl monobutylether), of triethyleneglycol (e.g. triethylene glycol dimethylether) and of propylene glycol; cyclic ethers such as tetrahydrofuran, alkyl-substituted tetrahydrofurans (e.g., 2,5-dimethyltetrahydrofuran) and dioxanes such as 1,4-dioxane; water-soluble, tetraalkylated aliphatic ureas and optionally also thioureas having 4 to 12 carbon atoms, e.g. tetramethylurea or tetraethylurea; water-soluble, aliphatic or cycloaliphatic sulphones or sulphoxides containing 2 to 10 carbon atoms, e.g. tetramethylenesulphone and dimethylsulphoxide; water-soluble, aliphatic or cycloaliphatic phosphoric acid amides, e.g. hexamethyl phosphoric acid triamide; acetonitrile and partially water-soluble propionitrile; water-soluble ketones such as acetone and partially water-soluble ketones such as methyl ethyl ketone.

The solvents may also be mixed in any proportions. Among the solvents mentioned above, those which boil at 56° to 250° C. at normal pressure, preferably at 64° to 165° C., are preferred because the hydrolysis products obtained are more easily worked up.

Preferred water-miscible solvents are dimethylformamide, dimethylacetamide, acetonitrile, acetone, methyl ethyl ketone and 1,4-dioxane. DMF is particularly preferred.

The addition of solvents containing isocyanate reactive groups is less preferred. These include alcohols such as i-propanol, t-butanol and ethyl glycol.

It is also less preferred to add substantially water-insoluble co-solvents to the mainly water-soluble solvents. Examples of such co-solvents include chlorinated and/or fluorinated aliphatic hydrocarbons such as di-, tri- and tetrachloromethane, trichlorofluoromethane, trichloroethane; aliphatic and aromatic hydrocarbons such as hexane and heptane and hydrocarbon mixtures of the ligroin or gasoline series, benzene, toluene, xylenes and higher alkylated aromatic compounds; and halogenated or nitrated aromatic compounds such as chlorobenzene or nitrobenzene.

The solvent if used should preferably be 60 to 100% of a solvent which is at least partly, preferably entirely water-miscible and contain cyclic or acyclic amide, ether, urea, sulphoxide, sulphone, phosphoric acid amide, nitrile or keto groups. Up to 40% of the solvent may be any of the solvents which have been described as less suitable.

The hydrolysis reaction mixture may (preferably) be a homogeneous, monophasic mixture or it may be a dispersion or emulsion. Working up of the product is generally easiest, however, when the mixture containing the polyamino hydroxyl product is a two phase reaction mixture which can easily be separated mechanically.

The hydrolytic conversion of the prepolymer containing NCO and OH groups and optionally NCO inert groups into the end product containing $NH_2$ and OH groups and optionally NCO inert groups may be carried out by various methods already known in the art for the hydrolysis of isocyanate compounds. Examples of specific hydrolysis processes include: catalytic carbamate formation and recovery of the amine with excess acid; catalytic carbamate formation and recovery of the amine with the equivalent quantity of acid; catalytic carbamate formation and recovery of the amine by (a) heat treatment of the reaction mixture or (b) extraction with a solvent; and catalytic hydrolysis of NCO compounds to $NH_2$ compounds in the presence of highly polar solvents containing amide groups. Each of these methods includes the hydrolytic conversion of NCO groups into $NH_2$ groups. The first three may include an intermediate stage (carbamate) but the last does not. Each of these methods is a preferred embodiment of the above-described general process.

The carbamate formation and recovery of the amine with excess acid (see DE-B No. 2,948,419/DE-B No. 3,161,249/DE-A No. 3,129,978) process may be carried out as follows.

In the first step, an NCO/OH prepolymer containing urethane and/or urea groups is converted into the corresponding carbamate at a temperature of 0° to 40° C. by its introduction into an aqueous alkali metal hydroxide solution or alkaline earth metal hydroxide solution or suspension or other basic catalyst in an amount such that the equivalent ratio of hydroxide to NCO groups is equal to or greater than 1:1. In a second step, the carbamate is converted into the free amine by the addition of an acid ion exchanger or a strong acid (optionally in excess) with liberation of carbon dioxide. The mineral acid possibly present in excess is neutralized by the addition of base, and the polyhydroxylamine obtained is separated from the reaction mixture in a known manner.

The acid ion exchangers useful in the process of the present invention may be any substance containing mobile acidic hydrogen atoms in an insoluble polymeric structure. Particularly suitable polymeric acids are ion exchange resins which have a styrene/divinylbenzene skeleton as the polymeric basis to which sulphonic acid groups are attached as acid functions.

In this process, the prepolymer is generally first dissolved in a water-miscible, inert solvent. Examples of suitable solvents include acetone, tetrahydrofuran and dioxane. The prepolymer may be used in a quantity of, for example, 1 to 400 parts for every 100 parts of solvent. The prepolymer is advantageously slowly introduced with stirring (preferably within 30 to 120 minutes) into an aqueous solution of an alkali metal hydroxide or alkaline earth metal hydroxide adjusted to a temperature of about 0° to 40° C. The concentration of alkali metal or alkaline earth metal solution is preferably 1 part by weight of base to 5–20 parts by weight of water. Inorganic and organic ammonium hydroxides (e.g. tetraalkylammonium hydroxide) are also suitable, but NaOH and KOH are preferred.

If the process is carried out without solvent, the isocyanate prepolymer, which should be at as low a viscosity as possible (preferably up to about 5000 mPas) and may have been previously heated (e.g. 30° to 90° C.) is added in a finely divided form (e.g. by injection through a nozzle) with rapid stirring. The quantity of water is increased if necessary to facilitate stirring (e.g. by a factor of 1.1 to 100).

The quantity of alkali metal hydroxide or alkaline earth metal hydroxide used is preferably calculated so that at least a small quantity of free base is left after the reaction has been completed. The ratio of NCO:OH ions is preferably in the range of 1:1.01 to 1:1.30 with alkali metal hydroxide being preferred. The concentration of residual base must not be too high because otherwise urethane groups present in the prepolymer after formation of the carbamate would also be hydrolyzed. A commercial emulsifier is advantageously added in quantities of from 0.1 to 1 part by weight (based on 100 parts of reaction mixture) to improve the homogeneity of the solutions. Vigorous stirring is recommended when mixing the isocyanate component with the hydroxide component. Stirring is preferably continued for about 15 to 180 minutes at 0° to 20° C. after all of the prepolymer has been added.

In the second step, the carbamate solution or suspension is combined with the ion exchanger at a rate depending on the vigorousness of gas evolution and the size of the apparatus (10 to 300 minutes) (See U.S. Pat. No. 4,525,590).

When ion exchange resins are used, working up of the end product is very simple. More particularly, if the polyaminohydroxide compound is soluble, the reaction product is filtered and the amine solution is freed from solvent by distillation. If the polyaminohydroxyl compound is only sparingly soluble, a suitable solvent may be added until the amine goes into solution and the filtering/distilling process described above is then carried out. If the polyaminohydroxyl compound is insoluble, it is filtered from the liquid medium and the residue is treated with a suitable solvent until the amine dissolves, and the process described above is then carried out.

The solvents used may be aprotic-dipolar, water-miscible solvents such as N-methylpyrrolidone, dimethylformamide and dimethylsulphoxide.

All of the polyaminohydroxyl compounds obtained are free from traces of volatile constituents at 0.01 to 0.1 Torr/60° to 100° C.

Specific examples of suitable commercially available acid ion exchangers are Lewatit SC 108, S 100, SP 112, and SP 120 ion exchangers, and Lewasorb A 10 ion exchange resin. Each of these is available from Bayer AG.

When the carbamate solution or suspension is acidified by means of a mineral acid, stirring is preferably continued at 0° to 20° C. for about 15 to 180 minutes after all of the prepolymer has been added. Concentrated mineral acid (e.g. sulphuric or phosphoric acid, preferably HCl) is then added with vigorous stirring and cooling as rapidly as the rate of evolution of $CO_2$ allows. The equivalent ratio of acid to base is preferably in the region of about 1.2:1 to 2.5:1, more preferably from 1.5:1 to 2.0:1, so that the reaction product is mildly acid (pH preferably below 6, in particular about 5.5 to 1). Excess mineral acid is neutralized by the addition of base (preferably an alkali metal hydroxide).

Subsequent working up may be carried out in several ways. For example, if two phases develop (in the case of short chained and hydrophobic polyamines), namely a polyaminohydroxyl compound/solvent and a solvent/salt/water phase, then the aqueous phase may be separated off by means of a separating funnel. This aqueous phase may then be discarded or extracted with dichloromethane, for example, in an amount such as 250 ml $CH_2Cl_2$ to 1 liter of aqueous solution.

If two phases do not form, 500 ml of dichloromethane, for example, may be added to 1 liter of reaction mixture and the whole mixture is vigorously shaken in a separating funnel. When the two phases have been left to settle, the solution containing solvent in addition to the polyaminohydroxyl compound is separated off. Solvent-free polyaminohydroxyl compound may be obtained by removal of all the volatile constituents by distillation.

The entire reaction mixture may also be freed from volatile constituents at 13 to 26 mbar/40° to 60° C. bath temperature. The oily residue obtained still contains alkali metal salts and is taken up with organic solvents such as $CH_2Cl_2$, methanol, ethanol, dioxane, etc. and separated from undissolved salt by filtration (paper filter, pressure filter).

For polyaminohydroxyl compounds based on isocyanate prepolymers which are resinous at room temperature, the aminopolyether may be precipitated from the reaction mixture with saturated sodium chloride solution. The polyamine may then be isolated by decanting, dried, redissolved in organic solvent and filtered from insoluble salts. The solvent is then distilled off.

In a second embodiment of the process of the present invention, an equivalent quantity of acid is used to recover the amine (See U.S. Pat. No. 4,525,590). In this process, as a first step, an isocyanate prepolymer containing urethane and/or urea groups as well as hydroxyl groups and optionally isocyanate inert groups is converted into the corresponding carbamate at a temperature of 0° to 40° C. by introduction of the prepolymer into an aqueous solution of base (preferably an alkali metal hydroxide solution). In a second step, the carbamate is combined with a quantity of strong acid equivalent to the quantity of base to be directly converted into the free amine. The base is converted into the corresponding acid salt and the free amine is then isolated in known manner.

If the isocyanate prepolymer is used in the form of a solution in an isocyanate inert solvent, the solvent may be used, for example, in a quantity of 100 parts to 1–400 parts of isocyanate prepolymer.

Both the compounds containing isocyanate groups and their solutions are preferably maintained at temperatures of 45° to 70° C. to increase their reaction velocity and enable them to be more finely distributed in the solution of base provided.

The quantity of base is generally from 0.3 to 2.0 equivalents per NCO group. It may, of course, be considerably higher in some cases but this is not advantageous for practical reasons. The quantity of base is generally calculated to ensure that a certain quantity of free base is left over after the reaction has been completed. If bases containing hydroxyl ions are used, such as alkali metal hydroxides, then the $NCO:OH^\ominus$ ratio should generally be in the region of from 1:1.2 to 1:1.8, most preferably from 1:1.4 to 1:1.6 mol.

The quantity of $OH^\ominus$ ions used could, however, be less than the stoichiometric quantity corresponding to the isocyanate groups. In that case, the products obtained are prelengthened via urea groups. This may be advantageous for certain purposes. An $OH^\ominus:NCO$ ratio of $\geq 0.3:1$ may be used in such cases.

If compounds containing tertiary amino groups are used, the ratio of NCO groups to tertiary amine groups used is preferably in the range of 1:1.01 to 1:1.5, more preferably 1.1:1.3. Larger quantities of amine may however be used.

To improve the homogeneity of the reaction mixture, it is advantageous to add a commercial emulsifier in a quantity of 0.05 to 1 part by weight, preferably about 0.1 to 0.5 parts by weight (based on 100 parts of reaction mixture).

Stirring is preferably continued for about 15 to 180 minutes at 10° to 25° C. after all the isocyanate prepolymer has been added, and the carbamate reaction mixture is then treated with acid. This acid treatment may be carried out by either of two different methods. In the first method, the carbamate reaction mixture is added dropwise to the acid component. Strong acids are used. For example, mineral acids such as hydrochloric acid, sulphuric acid, dilute nitric acid and phosphoric acid optionally in their aqueous form are suitable. Strong organic acids such as oxalic acid, formic acid or acetic acid or similarly strong organic acids which are at least as strong as acetic acid may also be used. Hydrochloric acid and sulphuric acid are preferred, especially sulphuric acid. The acid in the reaction vessel is preferably at a temperature of 0° to 20° C. The time taken for addition of the carbamate depends upon the vigorousness of gas evolution (which sets in immediately).

The equivalent ratio of acid to base is approximately 1:1, i.e. 1 gram equivalent of protons is used per gram equivalent of $OH^\ominus$ ions or per gram equivalent of a compound containing tertiary amino groups capable of removing a $H^\oplus$ ion (approximately equivalent quantities). The reaction mixture is then neutral to basic and corresponds to the pH of a mixture of alkali metal salts or amine salts and an aromatic or aliphatic amino compound. Stirring may then be continued for 5 to 30 minutes at 20° C.

In a preferred variation of this process, the carbamate component and the acid component are introduced separately into a common reaction vessel. These are preferably added at a rate such that the same equivalent quantities of OH⊖ ions or of tertiary amino groups and of protons enter the reaction chamber within the same period of time to avoid disequilibrium between the two reactants.

Acid ion exchange resins of the type described above as useful in the first preferred embodiment may be used as strong acids in both variations of this process.

In another embodiment of the present invention, carbamate formation and recovery of the amine are accomplished by heat treatment of the reaction mixture or extraction with a solvent. Such processes are disclosed in DE-B No. 3,266,392 and U.S. Pat. No. 4,540,720.

In this method, the isocyanate prepolymer component optionally dissolved in an isocyanate inert solvent, is mixed with a base and water to convert it into a reaction mixture containing compounds carrying carbamate groups. The polyaminohydroxyl compound is recovered from the reaction mixture containing compounds with carbamate groups by either heat treating the reaction mixture with decomposition of the carbamate groups in the mixture and separating off the polyamino hydroxyl compound or extracting with a solvent.

If the isocyanate compounds are used in the form of solutions, the preferred temperature range is from 20° to 40° C. but may be up to the boiling point of the particular solvent used. Solutions of isocyanate compounds may contain, for example, 10 to 1000 parts of isocyanate prepolymer to 100 parts of solvent.

When the isocyanate compounds are mixed with the basic medium, the resulting reaction solution should be at a low temperature in order to avoid side reactions as much as possible. The temperature of the reaction mixture of components should, if possible be below 100° C., preferably below 70° C. and better still below 40° C.

The low viscosity basic medium should preferably be at a very low temperature (e.g. at −25° C. to 40° C., preferably 0° C. to 25° C.) before the reaction. In addition, the mixture may be cooled during the reaction to keep the reaction temperature within the optimum range as far as possible, although the permissible reaction temperatures also depend upon the method of mixing and the reaction procedure.

The ratio of liquid volume initially introduced into the reaction vessel and liquid volume subsequently to be introduced is approximately in the range of 1:1 to 1:3 although these figures do not, of course, apply when a less preferred, solid isocyanate prepolymer is added in a finely dispersed form.

In a continuous process which is particularly suitable for large scale technical production, the isocyanate compounds (optionally as solutions) and the aqueous base are introduced separately into a common reaction chamber, reacted together with the aid of vigorous mixing (e.g. by means of a flow mixer) and rapidly discharged from the mixing chamber. The components may be dosed into the mixing chamber by means of graduated dropping funnels or by means of a piston and/or membrane dosing pump or some other mechanical dosing device. When the components are dosed on a continuous basis, very rapid reaction between the two components is preferred and may be achieved by mixing them together within a very short time (seconds or fractions of a second) by means of a suitable, optionally mechanically driven device. The mixture is then discharged from the reaction chamber. Suitable apparatus are described in detail in DE-B No. 3,266,392.

The reaction components are generally introduced to the flow mixer at temperatures of about −25° to 40° C. When a dynamic mixer is employed, as is preferred, the reaction temperatures rise to about 50°-150° C. due to the shearing forces produced, depending upon the heat of reaction. In general, however, it is advisable to keep the temperature below 100° C. (if necessary, by cooling the mixing apparatus).

If cosolvents are used, the temperature should be kept below the boiling point of those cosolvents if that boiling point is lower than the boiling point of water.

Various additives may be used to facilitate the reaction of the isocyanate groups with the aqueous base. For example, one or more commercial emulsifiers may be added (e.g. in quantities of 0.01–1 part by weight to 100 parts of reaction mixture) to facilitate homogenization. Catalytically active compounds may also be added to increase the reaction velocity. Suitable catalytically active compounds include compounds containing tertiary amino groups of the kind generally known in polyurethane chemistry and used in the production of polyurethane foams to accelerate the isocyanate-water reaction.

In accordance with the present invention, the compounds containing carbamate groups obtained by mixing the isocyanate compounds with the basic medium are directly converted into compounds containing amino groups, either by heat treating the reaction mixture containing the carbamate-carrying compounds to recover the amine or by extracting the reaction mixture with a solvent (carried out continuously or on a batch basis).

The heat treatment for carbamate decomposition is preferably carried out under conditions resulting in removal by distillation of water and of any other solvents. The reaction mixture containing carbamate groups is heated to temperatures above 40° C., preferably above 60° C. and most preferably above 80° C. for about 30 to 480 minutes by means of a source of heat. The solvent distils off during this heat treatment. This simultaneous heat treatment and distillation may be carried out under reduced pressure, e.g. at 200 to 950 mbar. The reduction in pressure may be carried out gradually and continuously. Thus distillation may be begun at normal pressure and terminated at about 0.5 mbar.

Any of the above-described treatment methods and modifications thereof which are described in the art may be used for a continuous process. Continuous recovery of the polyaminohydroxyl compound is preferably carried out by a heat treatment of the reaction mixture containing compounds with carbamate groups after continuous production of the said reaction mixture.

The compounds containing carbamate groups may also be converted into the corresponding compounds containing amino groups (polyhydroxylamines according to the invention) by treatment of the reaction mixture containing carbamate compounds with a suitable solvent.

In this method, it is particularly suitable to use water immiscible organic solvents which are non-solvents for the compounds containing carbamate groups and for the carbonic acid salts produced but which are good solvents for the amines formed in the reaction. Examples of such solvents include dichloromethane, trichloromethane, tetrachloromethane, cyclohexane, methyl-cyclohexane, pentane, hexane, benzene and toluene. Dichloromethane is particularly suitable.

In principle, it would also be possible to use water-miscible solvents provided they are at least poorer solvents for the carbonic acid salts than water. Examples of such solvents include methanol, ethanol, n-propanol, i-propanol, n-butanol, i-amyl alcohol, cyclic ethers such as dioxane or tetrahydrofuran, water-soluble acyclic ethers such as diethylene glycol dimethylether and ketones such as acetone and methyl ethyl ketone. Here again, a two phase system is obtained after conversion of the compound containing carbamate groups into a polyamine. The aqueous phase contains the carbonic acid salt while the amine is concentrated in the organic phase. Due to their mutual miscibility, however, a certain quantity of organic solvent and amine is also present in the aqueous phase while the organic phase contains a certain quantity of salt and water. The organic phase must therefore be filtered again after removal of the solvent by distillation.

Extraction may be carried out at normal, reduced or excess pressure and is preferably carried out at normal pressure.

The extraction process may be modified in that the reaction mixture containing compounds with carbamate groups may be mixed with subequivalent quantities of acids (based on the quantity of base, i.e. about 0.01 to 0.99 equivalents of acid per unit equivalent of base) before or during the extraction. Both this modification and the introduction of carbon dioxide are particularly suitable whenever an $OH^{\ominus}:NCO$ ratio greater than 1:1 has been used.

Catalytic hydrolysis of isocyanate compounds to $NH_2$ compounds in the presence of solvents, optionally very small quantities of catalyst is the most preferred process for producing the polyhydroxylamines of the present invention. (See, DE-A No. 3,223,395, DE-A No. 3,223,400, DE-A No. 3,223,398, DE-A No. 3,223,397, DE-A No. 3,223,396, DE-A No. 3,244,912.)

This preferred process may be carried out as a single stage process in which the isocyanate groups of compounds containing NCO groups and OH groups and optionally isocyanate inert groups are hydrolyzed with water at a temperature of from 20° to 210° C., preferably 40° to 150° C., optionally in the presence of compounds which are basic in reaction as catalysts and in the presence of at least 5 parts (based on 100 parts of isocyanate prepolymer) of at least partly water-miscible polar solvents. The water-miscible polar solvents preferably contain carboxylic acid dialkylamide, lactam, tetraalkylurea, sulphone, sulphoxide, phosphoric acid dialkylamide, nitrile, ether or ketone groups, and boil in the range of from 56° to 250° C. and have a dielectric constant of at least 10. A substantially homogeneous reaction mixture is maintained during the reaction.

In a particularly preferred embodiment of this process, the basic compounds, based on 100 parts by weight of isocyanate prepolymer component are selected from 0.0001 to 10 parts by weight of tertiary amine compounds, amidines and other strong basic amine compounds: 0.0001 to 10 parts by weight of alkali metal hydroxides, alkaline earth metal hydroxides, tetraalkylammonium hydroxides, alkali metal silicates, alkali metal aluminates, phenolates, thiophenolates, mercaptides, hydrogen sulphides of alkali metals, soluble alkali metal and alkaline earth metal salts of (iso) (thio)cyanic acid and β-diketone enolates; 0.0001 to 10 parts by weight of carbonates and bicarbonates of alkali metals; 0.0001 to 10 parts by weight of alkali metal and alkaline earth metal salts of organic carboxylic acids, hydroxycarboxylic acids and/or aminocarboxylic acids and mixtures thereof. The solvent component is made up of carboxylic acid dialkylamide and lactam solvents, acetone or acetonitrile in quantities of $\geq 10$ parts by weight (based on 100 parts by weight of isocyanate prepolymer component) and $\geq 0.75$ equivalents of water per equivalent of isocyanate groups in the isocyanate prepolymer component.

For complete conversion of the NCO groups into $NH_2$ groups it is necessary to use at least 0.75 mol of water per equivalent of NCO. If less than 0.5 mol of water is used, then prelengthening with urea formation preferentially takes place. On the other hand, it has surprisingly been found that a very large excess of water also results in a greater amount of prelengthening. This also occurs when the reaction mixture is a single phase. It has been found that the optimum quantity of water depends upon both the quantity of solvent used and upon the quantity of NCO groups to be converted.

The amount of water used for each equivalent of NCO groups is therefore preferably $\geq 0.75$ mol of water, in particular 0.75 to 50 mol of water, especially 1 to 35 mol of water and most preferably 1.25 to 12 mol of water. Based on 1000 g of solvent (e.g. DMF) water is used in quantities $\geq 1$ g, preferably $\geq 5$ g, more preferably 10 to 500 g, most preferably 20 to 300 g, and at the same time the quantity of water used should be at least $\geq 0.75$ mol, preferably $\geq 1$ mol of water per equivalent of NCO groups. If the absolute quantity of water necessary and the most advantageous solvent/water ratio are observed, then the quantity of solvent used is $\geq 10$ parts, preferably $\geq 100$ parts, most preferably up to 1000 parts by weight of solvent to 100 parts by weight of NCO prepolymer component. It has been found that the minimum quantity of solvent required for complete conversion of NCO to $NH_2$ depends upon the reaction temperature. The higher the reaction temperature, the lower the quantity of solvent may be. The quantity of water required is to a large extent unaffected by reaction temperature.

Simple preliminary experiments may be necessary to determine the optimum ratio of NCO equivalents to water and to solvent within the above-discussed ranges.

Compounds are considered to be catalysts if they are capable of raising the NH number of the amine(s) in the product to a level above that obtained without using them. A catalyst may be solid or liquid but must be sufficiently soluble, preferably completely soluble in the reaction mixture. Based on 100 parts by weight of the isocyanate component, the catalyst, if used, is used in a quantity of 0.00005 to 10 parts, preferably 0.001 to 5 parts, most preferably 0.005 to 1 part by weight of catalyst. The quantity of catalyst employed depends upon the solvent/water ratio. The optimum amount of catalyst is least when the solvent/water ratio is at the calculated optimum level but a certain minimum amount of catalyst may still be required. If the water/solvent ratio is not optimized, results may be improved by increasing the quantity of catalyst. The quantity of catalyst to be employed for complete conversion of NCO groups into $NH_2$ groups also depends upon the reaction temperature. It has been found that a larger quantity of catalyst is required at lower reaction temperatures (e.g. at 45° C.) than at higher temperatures (e.g. at 100° C.). If the amine yield is incomplete with a given quantity of catalyst, the yield may be increased by increasing the reaction temperature.

The process of the present invention could theoretically be carried out without a catalyst but very high temperatures of about 150° C. and higher are then required for complete conversion of NCO groups into $NH_2$ groups. The $NH_2$ yield progressively falls with decreasing temperature if no catalyst is used.

Basic inorganic and organic salts may be used as catalysts. In particular, the following may be used as catalysts in addition to those already mentioned above: hydroxides of alkali metals and alkaline earth metals and tetraalkylammonium hydroxides, in particular NaOH and KOH: soluble aluminates, e.g. sodium aluminate; carbonates of alkali metals, in particular soda and potash; bicarbonates of alkali metals, in particular sodium and potassium bicarbonate; alkali metal and alkaline earth metal salts of mono- and polycarboxylic acids free from isocyanate reactive groups; alkali metal salts of phenols and thiophenols optionally substituted with isocyanate inert groups; soluble alkali metal and alkaline earth metal salts of weak acids such as cyanic acid, isocyanic acid, thiocyanic acid, isothiocyanic acid, silicic acid, acids of trivalent to pentavalent phosphorus, hydrocyanic acid and hydrazoic acid; alkali metal mercaptides and sulphides and hydrogen (poly)sulphdies; β-diketone compounds such as sodium, potassium, magnesium and zinc acetyl acetonates and acetoacetates; also chemically incorporated catalysts which contain both an isocyanate reactive group such as a hydroxyl, mercapto, primary and/or secondary amino group or ketene aminal group and a group such as alkoxide, mercaptide, (thio)-phenolate, carboxylate, dialkyl tin, dialkylamino or amidine group which catalyze the reaction of isocyanate groups with isocyanate reactive groups such as OH or $NH_2$.

Basic catalysts containing nitrogen such as tertiary amines are also suitable. These nitrogen containing catalysts have an aliphatic or cycloaliphatic structure. Examples of such catalysts include in particular trialkylamines and dialkylaminoalkylethers as well as acyclic, cyclic or polycyclic compounds containing at least one unit having an amidine and/or guanidine structure. Specific examples of such catalysts are disclosed in German Patent Application Nos. P 3 530 476.6 and P 3 537 116.1. Examples of acylated tertiary amine derivatives are given in DE-A No. 2,523,633 and DE-A No. 2,732,292. Tertiary amines of the pyridine series and tertiary amines containing at least one aromatic group attached to the nitrogen atom (e.g. dimethylaniline) are also effective. Tertiary amines which are not water-soluble should preferably boil at temperatures below 250° C., in particular below 200° C.

Polyvalent metal compounds known in the literature as catalysts for isocyanate chemistry may also be used in the process of the present invention. These include in particular compounds of tin, zinc or lead such as dibutyl tin dilaurate, tin octoate and lead octoate. They are, however, generally less preferred.

The limits (in particular upper limits) which should be observed with respect to the quantities of solvents used in this process are: for every 100 parts by weight of isocyanate prepolymer compound, the quantity of solvent used in the reaction mixture for hydrolysis should be > 10, preferably 20 to 1000, most preferably 25 to 300 parts by weight The quantity of water and optionally solvent used should be sufficient to form a substantially homogeneous (at the most slightly cloudy) or preferably a homogeneous, clear solution with the isocyanate compound at the reaction temperature(s). The quantity of water used is preferably sufficient to form a single phase mixture at any process temperature but always within the limits of what has been stated above concerning the ratio of solvent (e.g. DMF) to water and the ratio of water to isocyanate prepolymer component The catalytically active compounds are generally added to the solvents and water. They could in some cases be added to the compound containing isocyanate groups but this is not preferred.

If the isocyanate compound is to be hydrolyzed to polyamine with a sufficiently high amine number (high conversion rate) it is advantageous to maintain the concentration of isocyanate compound in the reaction mixture at ≦90 wt. %, preferably ≦80 wt. %.

At the same time, the quantity of solvent added should be sufficient to maintain a substantially homogeneous, preferably a completely homogeneous reaction mixture, but always within the above-defined quantitative ratios of water to solvent to isocyanate.

Prelengthening may occur as a side reaction of the process. That is, the isocyanate may react with the amine already formed to produce ureas by chain linking. This side reaction can to a large extent be suppressed by carrying out the process in a dilute solution, using a catalyst and maintaining relatively high reaction temperatures, (e.g. 80° to 130° C.). Although it is desirable to keep the extent of these side reactions as low as possible, a certain amount of prelengthening may be accepted for economic reasons. Keeping the isocyanate concentration at ≦90 wt. % and maintaining a substantially homogeneous reaction mixture, however, enables the isocyanate groups to be virtually completely converted into $NH_2$ groups if the process parameters are carefully observed.

The reaction is preferably carried out in a homogeneous phase. Slight overdosing with water or with the isocyanate compound may give rise to cloudiness in the reaction mixture because the starting materials are then incompletely dissolved.

The hydrolysis reaction may be carried out at temperatures of from 20° to 210° C., as already mentioned above, but it is preferably carried out at 40° to 150° C., most preferably at 80° to 130° C. because these temperatures provide the best volume/time yields combined with high solubility and, surprisingly, the least amount of urea prelengthening. In some cases it may be necessary to operate under pressure in order to reach sufficiently high temperatures. On the other side it is also possible to reduce pressure in some cases. Then it is possible to reduce the amount of catalyst or it is even possible to work without a catalyst.

The onset of the reaction is recognized by the almost spontaneous evolution of $CO_2$. This can even be observed at low temperatures, e.g. at 10° C., but it is much more advantageous to employ higher temperatures in order to suppress urea formation. Thorough and rapid mixing with formation of a homogeneous solution of the reactants is important. This may be achieved mainly by using solvents but also by lowering the viscosity by application of elevated reaction temperatures. The reaction may be carried out either continuously or batchwise.

Information with respect to both the continuous and the batchwise process of the present invention is disclosed in DE-OS No. 3,223,397, page 32, line 20 to page 35, line 10.

Working up of the product may also be carried out continuously or batchwise. The reaction mixture is normally worked up by distillation, extraction or phase separation or by a combination of these methods.

If the isocyanate-containing compound still contains free (i.e. monomeric) isocyanate from the process of its preparation, any monomeric amine formed from this monomeric isocyanate is liable to accumulate in the water/solvent phase if the product is worked up by phase separation. The polyaminopolyol obtained by this simple method of working up is then virtually free from monomer. In that case, however, it may be advisable to free the aqueous solution from monomeric amine before it is reused.

In the preferred method of working up, the reaction mixture is worked up without phase separation by distilling off the solvent or solvent/water mixture after termination of the reaction (no further evolution of $CO_2$ observed), preferably with the aid of a vacuum, e.g. at 1 to 700 Torr, optionally followed by application of an even higher vacuum, e.g. 0.001 to 1 Torr to remove volatile residues. It has been found to be advantageous to carry out this method at temperatures beginning at about 60° to 100° C. and later rising to 80° to 100° C. The solvent removed by distillation may be used again, optionally several times.

The polyamino alcohols obtained by the various methods of working up are generally colorless to slightly colored, low to medium viscosity (possibly higher melting) products having the required amino/hydroxyl group content. These polyaminopolyols in addition may contain urethane and/or urea and/or uretdione and/or isocyanurate and/or biuret groups, depending upon their starting materials. In some cases, ether and/or acetal and/or carbonate and/or ester and/or thioether and/or dialkylsiloxane groups and/or the residues of polybutadienes may also be present in the product groups if these were already present in the isocyanate compounds. Additional linkages may form as a result of side reactions. For example, urea groups may form during hydrolysis from parts already saponified and any still remaining isocyanate groups. The quantity of primary aromatic amino groups present in the polyaminopolyols is at the most equal to the quantity of isocyanate groups in isocyanate prepolymer starting material.

The polyaminohydroxyl compounds of the present invention, especially those containing aromatic primary amino groups, are preferred reactants for (optionally masked) polyisocyanates in the production of polyurethane ureas, cellular or non-cellular polyurethane(urea) plastics and polyurethane(urea) foams due to their low pressure. These polyaminohydroxyl compounds may be used either alone or in combination with other low molecular weight (molecular weights 32 to 399) and/or relatively high molecular weight (molecular weight 400 to about 12,000) compounds containing isocyanate reactive groups (hydroxyl, amino, thiol, hydrazide and similar groups).

Suitable starting components for the production of polyurethane plastics in accordance with known processes are mentioned above in connection with the preparation of the isocyanate prepolymer starting material as well as in DE-A Nos. 2,302,564, DE-A No. 2,432,764, U.S. Pat. No. 3,903,679 and DE-A No. 2,639,083, 2,512,385, 2,513,815, 2,550,796, 2,550,797, 2,550,833, 2,550,860 and 2,550,862. The above-listed disclosures also indicate auxiliary agents and additives which may optionally be used for the production of polyurethanes.

The use of the polyaminohydroxyl compounds of the present invention for the production of polyurethane(ureas)s is also a subject of the present invention. These polyaminohydroxyl compounds may be used, for example, for the production of elastomers, coatings, and threads spun from melts, solutions, dispersions and reactive component mixtures. The main purpose for which the polyaminohydroxyl compounds of the present invention are used, however, is the production of molded parts with compact surfaces by the RIM (reaction injection molding) process in closed molds for use in the manufacture of motor vehicles as mudguards, door panels, swellers, bumpers, all-round paneling and spoilers.

Those polyaminohydroxyl compounds in which the sum of equivalents of primary amino groups ($Eq_{NH}$), of hydroxyl groups ($Eq_{OH}$) and of any inert end groups ($Eq_{IN}$) minus the sum of equivalents of hydroxyl groups and any inert groups present is equal to $2\pm0.25$, preferably $2\pm0.1$ as represented by the equation:

$$(Eq_{NH}+Eq_{OH}+Eq_{IN})-(Eq_{OH}+EQ_{IN})=2\pm0.25 \qquad (A)$$

(preferably $=2\pm0.1$)
are particularly suitable for the RIM process.

In the case of polyether compounds corresponding to formula (I), for example, this means that $(r+p+s)-(p+s)=2\pm0.25$, preferably $2\pm0.1$. The presence of approximately two primary amino groups in the preferably relatively high molecular weight polyaminohydroxyl compounds containing urethane and/or urea groups of the present invention ensures a particularly smooth and favorable production of a polymer by the RIM process and correspondingly advantageous mechanical properties of the product.

Where no inert end groups are present in the polyaminohydroxyl compound (as is preferred), the following compounds are preferred for use in a RIM process:

| tri- | poly- | and | $1\pm0.25$, more preferably |
| functional | amino | | $1\pm0.10$ hydroxyl groups |
| tetra- | hydroxyl | | $2\pm0.25$, more preferably |
| functional | compounds | | $2\pm0.10$ hydroxyl groups |
| penta- | containing | | $3\pm0.25$, more preferably |
| functional | $2\pm0.25$ | | $3\pm0.10$ hydroxyl groups |
| hexa- | amino | | $4\pm0.25$, more preferably |
| functional | groups | | $4\pm0.10$ hydroxyl groups | especially those based on trifunctional compounds.

The methods for producing molded parts (from integral foams) and the technology of RIM have been fully described in the literature. Such disclosure is made, for example, in the handbook, BAYER-Polyurethane, Order No. PU 50025/BAYER AG, D-5090 Leverkusen, Issue 1.79, D100-779/847990, pages 139–179, and in Kunststoff-Handbuch, Volume 7, Polyurethane (publishers C. Hanser-Verlag), Munich, Vienna, 1983, pages 333–390.

The polyaminohydroxyl compounds of the present invention, in particular those which fulfill the conditions of Equation A and especially those based on trifunctional polyethers yield molded parts which have increased rigidity, both at room temperature and in particular at elevated temperatures (e.g. 120° C.), a higher heat distortion value and a distinctly better "sag" value when compared with corresponding polyamino compounds containing amino end groups, corresponding polycarboxyl compounds (containing only OH groups) and mixtures of these components.

Other applications for the polyaminohydroxyl compounds of the present invention include, for example, their use as coupling components for diazo dyes, as hardeners for epoxide and phenol resins and their use in any other known reactions of amines such as amide formation or imide formation and as other modifying agents for polyamides.

The invention is further illustrated but is not intended to be limited by the following examples in which all parts and percentages are by weight unless otherwise specified.

EXAMPLES

Example 1

400 g of a linear hydroxypolyether with OH number 28 prepared by blockwise addition, first of 80 wt. % of propylene oxide and then of 20 wt % of ethylene oxide, to propylene glycol, and 22.2 g of isophorone diisocyanate (IPDI) were stirred, first at 40° C. for 3 hours and then at 120° C. for 3 hours. The isocyanate value of the NCO/OH prepolymer obtained was 0.7 wt. % (theoretical 0.99%) NCO for a 1:1 adduct of this polyether and IPDI containing one free NCO group and one free hydroxyl group. This prepolymer containing isocyanate and hydroxyl groups was immediately converted into the amine as follows:

A mixture of 400 g of water, 1 g of an emulsifier (alkylsulfate-potassiumsalt type) and 4 g (0.1 mol) of NaOH was introduced into the reaction vessel at 20° C. The prepolymer described above was run into this mixture at 20° C. within 30 minutes with stirring. After further stirring at this temperature for 5 minutes, the reaction mixture was stirred at 80° C. for one hour and water was then distilled off at 100° C./18 mbar subsequently at 100° C./0.13 mbar and the salt was filtered off. The polyaminohydroxyl product had the following properties:

| | |
|---|---|
| NH number (HClO$_4$): | 26.3 mg KOH/g (from acid titration) |
| NH/OH number (AC$_2$O/Py): | 36.38 mg KOH/g (NH$_2$ plus OH groups measured) |
| Acid number (Ac$_2$O/Py) | 0.6 mg KOH/g |
| IPDA content (HPLC): | 0.997% |
| Viscosity at 23° C.: | 4,400 mPas. |

Example 2

In this example, an NCO/OH prepolymer having an isocyanate content of 1.83% prepared from 1000 g (0.500 mol) of a polypropylene glycol with OH number 56 and 87 g (0.500 mol) of toluylene diisocyanate was used. The prepolymer was worked up as soon as it had been prepared and the above-mentioned isocyanate content had been reached to prevent the prepolymer from continuing to react to form an isocyanate-free high polymer polyurethane.

A mixture of 500 g of water, 28.4 g of NaOH (0.71 mol) and 0.2 g of an emulsifier (Mersolat H of Bayer AG) was introduced into the reaction vessel at 20° C. The prepolymer described above was then added with stirring at this temperature in the course of 20 minutes and stirring was continued for a further 15 minutes at this temperature. The product which was then worked up as in Example 1 had the following properties:

| | |
|---|---|
| NH number (HClO$_4$): | 20.4 mg KOH/g |
| NH/OH number (Ac$_2$O/Py): | 48.7 mg KOH/g |
| Acid number (Ac$_2$O/Py): | 0.14 mg KOH/g |
| TDA content (HPLC): | 0.297% |
| H$_2$O: | 0.10% (Karl Fischer) |
| Viscosity at 23° C.: | 8,500 mPas. |

Example 3

A prepolymer with isocyanate content 1.3% prepared from 1000 g of a polyether triol with OH number 27 (prepared by blockwise addition, first of 78 wt. % of propylene oxide and then of 22 wt. % of ethylene oxide to trimethylolpropane) and 43.4 g of toluylene-2,4-diisocyanate by stirring the components for one hour at 80° C. was used in this example. The product was worked up immediately after it had been prepared.

A mixture of 1 liter of water, 22.3 g of NaOH (0.56 mol) and 0.5 g of Mersolat H emulsifier was introduced into the reaction vessel at 20° C. The NCO/OH prepolymer described above was added with stirring at this temperature in 15 minutes and stirring was continued at this temperature for a further 15 minutes. The product which was worked up as in Example 1 had the following properties:

| | |
|---|---|
| NH number (HClO$_4$): | 19.5 mg KOH/g (theoretical: 17.2 mg KOH/g) |
| NH/OH number (Ac$_2$O/Py): | 36.5 mg KOH/g |
| Acid number (AC$_2$O/Py): | 0.2 mg KOH/g |
| TDA (HPLC): | 0.062% |
| Viscosity at 23° C.: | 3800 mPas |

Example 4

An NCO/OH prepolymer with an NCO content of 1.3% prepared from 1000 g of the polyether from Example 3 and 55.9 g of toluylene-2,4-diisocyanate by heating at 80° C. for 90 minutes was used in this Example. The prepolymer was worked up as soon as it had reached the NCO content of 1.3%.

A cold mixture (20° C.) of 1000 g of water, 19 g of NaOH (0.475 mol) and 1 g of Mersolat H emulsifier was introduced into the reaction vessel. 1 kg of the NCO/OH prepolymer described above was added within 30 minutes and the mixture was then stirred for 10 minutes and kept at 80° C. with stirring for 1 hour. The reaction product which was worked up as in Example 1 had the following properties:

| | |
|---|---|
| NH number (HClO$_4$): | 21.5 mg KOH/g |
| NH/OH number (Ac$_2$O/Py): | 32.2 mg KOH/g |
| TDA (HPLC): | 0.212% |
| Acid number (Ac$_2$O/Py): | <0.1 mg KOH/g |
| Viscosity at 23° C.: | 6,500 mPas |

Example 5

The NCO/OH prepolymer used in this Example had an NCO content of 0.61% and was prepared from 9,500 g of a polyether with OH number 28 (prepared by blockwise addition, first of propylene oxide and then of 17 wt. % of ethylene oxide to trimethylolpropane) and 276 g of toluylene-2,4-diisocyanate by stirring for 5 hours at 60° C. This prepolymer contained on average about two OH groups to every NCO group. It was worked up as follows immediately after it had been prepared:

A mixture heated to 90° C. of 1000 ml of dimethylformamide (DMF), 50 ml of water and 0.1 g of KOH was introduced into the reaction vessel. 1000 g of the NCO/OH prepolymer described above was added at this temperature within 10 minutes. When all the prepolymer had been added (and CO evolution had ceased) the solvent and excess water were distilled off by application of a vacuum (initially 19 mbar, subsequently 0.13 mbar) and elevation of the bath temperature to 100° C. The polyaminohydroxyl product had the following properties:

| | |
|---|---|
| NH number (HClO$_4$): | 10.4 mg KOH/g |
| NH/OH number (Ac$_2$O/Py): | 30.4 mg KOH/g |
| Acid number (AC$_2$O/Py): | <0.2 mg KOH/g |
| TDA content (HPLC): | 0.305% |
| Viscosity at 23° C.: | 2,500 mPas |

Example 6

The NCO/OH prepolymer used in this example had an NCO content of 1.5% and had been prepared from 500 g of the polyether from Example 5 and 29 g of toluylene-2,4-diisocyanate by reacting the components for 3.5 hours at 60° C. This NCO/OH prepolymer contained on average about two NCO groups to one OH group. It was used for further processing immediately after it had been prepared.

A mixture heated to 90° C. of 1000 ml of DMF, 50 ml of water and 0.1 g of KOH was introduced into the reaction vessel, 1000 g of prepolymer described above were added within 12 minutes with stirring and the product was then worked up as in Example 5. The polyaminohydroxyl product had the following properties:

| | |
|---|---|
| NH number (HClO$_4$): | 20.4 mg KOH/g |
| NH/OH number (Ac$_2$O/Py): | 31.6 mg KOH/g |
| TDA content (HPLC): | 0.549% |
| Viscosity at 23° C.: | 3,200 mPas |

Example 7

A prepolymer with NCO content of 2.1% prepared from 1000 g of a polyether with OH number 50 by 3 hours stirring with 144.5 g of 2,4-toluylene diisocyanate at 60° C. was used in this example. The polyether used was a mixture of two polyethers (A) and (B). Polyether (A) was obtained by blockwise addition, first of 87 wt. % of propylene oxide and then of 13 wt. % of ethylene oxide to glycerol and had an OH number of 35. Polyether (B) had an average functionality of 2.4 and was prepared by the addition of propylene oxide to a water/trimethylolpropane mixture having an OH equivalent ratio of 53%:47%. Its OH number was 56. The OH number of the mixture was 50 and the functionality of the mixture was 2.5. The NCO/OH prepolymer was used for further processing 12 hours after its preparation. During this time the NCO value fell from 2.3% to 2.1%. The prepolymer contained on average one hydroxyl group to every two NCO groups.

A mixture of 1,300 g of DMF, 40 ml of water and 0.02 g of KOH was introduced into the reaction vessel. 960 g of the prepolymer described above (NCO content 2.1%) were added within 20 minutes at an internal temperature of 90° C. The product which was then worked up as in Example 5 had the following properties:

| | |
|---|---|
| NH number (HClO$_4$): | 30.9 mg KOH/g |
| NH/OH number (Ac$_2$O/Py): | 50.8 mg KOH/g |
| Acid number (Ac$_2$O/Py): | <0.1 mg KOH/g |
| TDA content (HPLC): | 1.364% |
| Viscosity at 25° C.: | 3,740 mPas |

Example 8

The NCO/OH prepolymer used in this example had an NCO content of 1.06% and was prepared from 1100 g of the polyether mixture from Example 7 by the reaction of this mixture with 57 g of toluylene-2,4-diisocyanate for 3 hours at 60° C. The prepolymer obtained had an average of two OH groups to one NCO group.

A mixture of 700 g of DMF, 21 ml of water and 0.01 g of KOH was introduced into the reaction vessel. 1000 g of the prepolymer described above were added within 20 minutes with stirring at an internal temperature of 90° C. The product which was worked up as in Example 5 had the following properties:

| | |
|---|---|
| NH number (HClO$_4$): | 13.5 mg KOH/g |
| NH/OH number (Ac$_2$O/Py): | 47.0 mg KOH/g |
| Acid number (Ac$_2$O/Py): | <0.1 mg KOH/g |
| TDA content (HPLC): | 0.608% |
| Viscosity at 25° C.: | 1,870 mPas |

Example 9

The NCO/OH prepolymer used in this example was obtained by reacting 1700 g of the polyether mixture from Example 7 with 238 g of toluylene-2,4-diisocyanate for 4 hours at 60° C. It had an isocyanate content of 2.9% and contained on average one hydroxyl group to nine NCO groups.

A mixture of 600 g of DMF, 20 ml of water and 0.03 g of KOH was introduced into the reaction vessel. 0.5 kg of the prepolymer described above were added with stirring at an internal temperature of 90° C. The reaction mixture was worked up as described in Example 5. The product had the following properties:

| | |
|---|---|
| NH number (HClO$_4$): | 38.6 mg KOH/g |
| NH/OH number (Ac$_2$O/Py): | 51.4 mg KOH/g |
| Acid number (AC$_2$O/Py): | <0.05 mg KOH/g |
| TDA content (HPLC): | 0.603% |
| Viscosity at 25° C.: | 8,300 mPas |

Example 10

The NCO prepolymer (1.3% NCO) used in this example was prepared by reaction of 1,200 g of the polyether of Example 5 with 100.8 g of 4,4'-diisocyanatodiphenylmethane for 3 hours at 50° C. The NCO/OH prepolymer contained on average two NCO groups to one hydroxyl group.

A mixture of 1000 g of DMF, 10 g of water and 0.08 g of KOH was introduced into the reaction vessel. 0.5 kg of the prepolymer described above were added within 10 minutes at 90° C. The product which was worked up as in Example 5 had the following properties:

| NH number (HClO₄): | 23.5 mg KOH/g |
|---|---|
| NH/OH number (Ac₂O/Py): | 36.8 mg KOH/g |
| MDA content (HPLC): | 2.12% |
| Acid number (Ac₂O/Py): | <0.2 mg KOH/g |
| Viscosity at 23° C.: | 6,000 mPas |

Example 11

16.4 g (0.166 mol) of n-butylisocyanate were added to 500 g of a polyether polyol with OH number 56 obtained by the blockwise addition of 95.3 wt. % of propylene oxide followed by 4.7 wt. % of ethylene oxide to glycerol (=0.5 mol OH). The reaction mixture was stirred for 3 hours at 90° C. and then for 14 hours at 80° C. No NCO could be detected by IR spectroscopy at the end of this time.

29 g (0.166 mol) of 2,4-diisocyanatotoluene were then added to this product and the mixture was stirred at 60° C. for 90 minutes. The isocyanate content fell to 1.26% (calculated 1.28%).

450 g of this prepolymer were added within 20 minutes at 90° C. to a previously prepared mixture of 300 g of dimethylformamide, 4.8 ml of water and 0.02 g of KOH. Stirring was continued for 5 minutes at 90° C. after all the prepolymer had been added. The volatile constituents were then distilled off. The product left behind which contained terminal n-butylurethane, 4-methyl-3-aminophenylurethane and hydroxyl groups had the following properties:

| NH number (HClO₄): | 15.7 mg KOH/g |
|---|---|
| (theoretical according to NCO content: 16.9) | |
| NH/OH number (Ac₂O/Py): | 36.3 mg KOH/g |
| Viscosity at 25° C. | 2000 mPas. |
| TDA content (HPLC): | 0.006% |

Use Example

In this example polyurethane urea elastomer moulded products were produced and their mechanical properties compared with each other. Recipes in which the NCO-reactive component contained
(a) a polyaminohydroxyl compound according to the invention (polyol C) or
(b) suitable comparative compounds (polyols A, B, and D)

were used for the production of the moulded products. A piston-type high-pressure metering device with an MQ-mixing head (made by Maschinenfabriken Hennecke, St. Augustin) and automatic control was used for the production of the moulded products. The operating pressure was 200 bars.

The polyol and isocyanate components mentioned below were intimately mixed using this apparatus and processed into moulded parts with the mechanical properties described below. The temperatures of the raw materials were in each case 35°–40° C., the temperature of the mould was about 60° C.

The mould used was made of polished steel, had internal dimensions of 200×300×4 mm and interior walls coated with an external release agent with a wax base (® Acmos Fluoricon 36/34 made by the Acmos company). The filling time was about 1 sec., the demoulding time was 30 secs.

Recipes I–IV

NCO-reactive component:
75 parts of polyols A, B, C or D (for recipes I–IV)
25 parts of a mixture of 65 parts of 1-methyl-3,5-diethyl2,4-diaminobenzene and 35 parts of 1-methyl-3,5-diethyl-2,6-diaminobenzene ("Detda")
0.3 parts of Dabco 33 LV (aminic catalyst made by Air Products)
0.1 parts of UL 28 (tin catalyst made by Witco)
Isocyanate component:
PA 100, a commercial isocyanate, based on diphenyl methane diisocyanate—made by BAYER AG—NCO-content: 23%.
Indices: 100, 110

Polyol A: Polyethertriol with an OH number of 28, obtained by the block-wise addition of 73% by weight of propylene oxide and then 17% by weight of ethylene oxide to trimethylolpropane.

Polyol B: Polyether amine with an NH number of 24.5, obtained by the hydrolysis of an NCO prepolymer of polyol A and 2,4-toluylene-diisocyanate with an NCO content of 1.9% by weight (process according to DE-A No. 3 613 249).

Polyol C: (according to the invention): Polyhydroxylamine compound with an (NH+OH) number of 31.6 from example 6.

Polyol D: Mixture of 66.6 parts of polyol B and 33.3 parts of polyol A.

Table of values

| | Recipe | | | | | | | | |
|---|---|---|---|---|---|---|---|---|---|
| | I | | II | | III | | IV | | |
| Index | 100 | 110 | 100 | 110 | 100 | 110 | 100 | 110 | |
| Tensile strength | 32,4 | 41,2 | 33,1 | 39,9 | 34,3 | 39,7 | 38,5 | 39,4 | MPa |
| Elongation at break | 260 | 250 | 289 | 247 | 191 | 155 | 316 | 282% | |
| Tear resistance | 90 | 88 | 86 | 54 | 63 | 47 | 34,3 | 29,1 | kN/m |
| Sag test 1 h/160° C. 10 cm overhang | 10,9 | 6,9 | 13,6 | 7,9 | 6,1 | 4,4 | 17,0 | 9,3 | mm |
| Shore D hardness | 62 | 62 | 64 | 67 | 72 | 71 | 66 | 66 | — |
| Flexural E modulus | 512 | 570 | 682 | 697 | 725 | 795 | 483 | 555 | MPa |
| HDT value (ISO-R 75 B) | 85 | 92 | 89 | 98 | 122 | 123 | 103 | 109 | °C. |
| Tension impact test-elongation | 238 | 189 | 193 | 181 | 156 | 126 | — | — | % |

The test shows:
(1) that recipe III (containing the polyether hydroxylamine according to the invention) has the greatest rigidity and the best heat stability compared with the pure polyhydroxyl or the pure polyamine compound.
(2) that polyol C cannot be replaced by a corresponding mixture of polyols A and B.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyaminohydroxyl compound having a molecular weight of from 200 to 20,000 and a functionality of greater than 1 but less than or equal to 8 containing:
   (a) 0.165–16.5 wt. % amino and hydroxyl groups in quantities such that the equivalent ratio of amino groups to hydroxyl groups is from 99:1 to 0.1:99.9;
   (b) 0.295–29.5 wt. % urethane and/or urea groups; and
   (c) groups which are inert with respect to amines and isocyanates in quantities such that the equivalent ratio of amine groups to inert groups is from 100:0 to $33.\overline{3}:66.\overline{6}$ and the equivalent ratio of hydroxyl groups to inert groups is from 100:0 to $33.\overline{3}$ to $66.\overline{6}$.

2. The compound of claim 1 having a molecular weight of from 400 to 12,000 and a functionality of from 1.5 to 6.

3. The compound of claim 1 having a molecular weight of from 1000 to 7000 and a functionality of from 2 to 4.

4. The compound of claim 1 containing 0.4–5 wt. % amino and hydroxyl groups.

5. The compound of claim 1 in which the equivalent ratio of amino groups to hydroxyl groups is from 80:20 to 20:80.

6. The compound of claim 1 which further contains polyether groups.

7. The compound of claim 1 in which the sum of equivalents of primary amino groups plus hydroxyl groups plus any inert groups minus the sum of equivalents of hydroxyl groups plus any inert groups is 2±0.25.

8. The polyaminohydroxyl compound of claim 1 corresponding to the formula

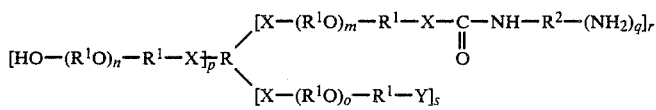

in which
X represents an NH group or O,
Y represents hydrogen or a monovalent organic group,
R represents a group obtained by removing (p+r+s) XH, groups from a (p+r+s)-valent polyamine, polyalcohol or amino alcohol,
$R^1$ represents a $C_2$–$C_4$-alkylene group, an alkyl-substituted $C_2$–$C_4$-alkylene group or aryl-substituted $C_2$–$C_4$-alkylene group,
$R^2$ represents a (q+1)-valent group obtained by removing (q+1) NCO groups from a (q+1)-valent polyisocyanate,
q represents a number from 1 to 2,
m, n, o represent numbers sufficient to bring the molecular weight of the polyaminohydroxyl compound in the range of from 200 to 20,000 and
p, r and s each represent a number such that p+r+s is equal to a value of from 2 to 8 and the ratio of p to s is from 100:0 to $33.\overline{3}:66.\overline{6}$, the ratio of r to p is from 99:1 to 0.1:99.9 and the ratio of r to s is from 100:0 to $33.\overline{3}:66.\overline{6}$.

9. The compound of claim 8 in which Y represents an alkyl, aryl or alkoxyl group.

10. The compound of claim 8 in which Y represents OCONH-monovalent organic group or an NHCONH-monovalent organic group.

11. The compound of claim 8 in which each $R^1$ represents an ethylene or 1,2-propylene group.

12. A mixture containing
   (a) 75–100 wt. % of the polyaminohydroxyl compound of claim 8,
   (b) 0–5 wt. % of a compound corresponding to the formula

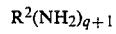

in which
$R^2$ represents a (q+1)-valent group obtained by removing (q+1) NCO groups from a (q+1)-valent polyisocyanate and
q represents a number from 1 to 2 or secondary products thereof, and
   (c) 0–20 wt. % of a compound from which the polyaminohydroxyl compound (a) was prepared.

13. The mixture of claim 12 in which compound (c) corresponds to the formula

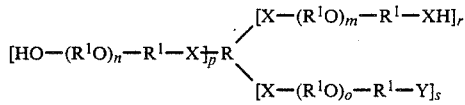

and/or

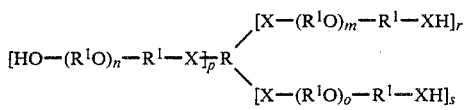

in which
X represents an NH group or O,
Y represents hydrogen or a monovalent organic group,
R represents a group obtained by removing (p+r+s) XH groups from a (p+r+s)-valent polyamine polyalcohol or amino alcohol,
R' represents a $C_2$–$C_4$-alkylene group, an alkyl-substituted $C_2$–$C_4$ alkylene group or an aryl-substituted $C_2$–$C_4$ alkylene group,
m, n and o represent numbers sufficient to bring the molecular weight of the compound within the range of from 200 to 20,000, and
p, r and s represent numbers such that p+r+s is equal to a value of from 2 to 8 and p:s=100:0 to $33.\overline{3}:66.\overline{6}$, r:p=99:1 to 0.1:99.9, r:s=100:0 to $33.\overline{3}:66.\overline{6}$.

14. A mixture containing
   (a) 75–100 wt. % of the polyaminohydroxyl compound of claim 1,
   (b) 0–5 wt. % of a compound corresponding to the formula $$R^2(NH_2)_{q+1}$$

in which

R² represents a (q+1)-valent group obtained by removing (q+1) NCO groups from a (q+1)-valent polyisocyanate, and q represents a number from 1 to 2, and (c) 0-20 wt. % of a compound from which the polyaminohydroxyl compound (a) was prepared.

15. A process for the production of the polyaminohydroxyl compound of claim 1 in which
(a) an isocyanate containing hydroxyl groups and also urethane and/or urea groups and having a functionality of from greater than 1 to 8 in which
  (1) 0.3-25.9 wt. % free NCO groups and
  (2) 0.295-29.5 wt. % urethane and/or urea groups are present and the ratio of NCO groups to hydroxyl groups is in the range of from 90:100 to 0.1:99.9
is hydrolyzed with
(b) at least 0.75 mol of water for each equivalent of NCO groups to form the polyaminohydroxyl compound.

16. The process of claim 15 in which the isocyanate (a) also contains groups that are inert with respect to isocyanate groups in an amount such that the ratio of isocyanate groups to inert groups is from 100:0 to 80:20 and the ratio of hydroxyl groups to inert groups is from 100:0 to 33.3:66.6.

17. The process of claim 15 in which at least 1 mol of water for each equivalent of NCO groups is used.

18. The process of claim 15 in which the isocyanate (a) has a functionality of from 2 to 4.

19. The process of claim 15 in which a hydrolysis catalyst selected from basic compounds, tertiary amines, metal catalysts and mixtures thereof is employed.

20. The process of claim 15 in which the hydrolysis is carried out in the presence of a solvent.

21. A process for the production of the polyaminohydroxyl compound of claim 1 in which
(a) an isocyanate containing 0.3-25.9 wt. % free NCO groups and 0.295 to 29.5 wt. % urethane and/or urea groups having a functionality of from greater than 1 to 8 in which the ratio of NCO groups to hydroxyl groups is from 90:100 to 0.1:99.9
is mixed with
(b) at least 0.75 mol of water for each equivalent of NCO groups
and
(c) a base
to form a reaction mixture containing compounds with carbamate groups and converting the carbamate groups to amine groups.

22. The process of claim 21 in which the conversion to amino groups is accomplished by heat treatment and/or acid treatment and/or extraction with an organic solvent.

23. A process for the production of the polyaminohydroxyl compound of claim 1 in which
(a) an isocyanate containing 0.3-25.9 wt. % free NCO groups and 0.295 to 29.5 wt. % urethane and/or urea groups having a functionality of from greater than 1 to 8 in which the ratio of NCO groups to hydroxyl groups is from 99.1 to 0.1:99.9
is hydrolyzed at 25° to 210° C. in a substantially homogeneous phase with
(b) at least 0.75 mol of water for each equivalent of NCO groups
in the presence of
(c) a basic catalyst and
(d) a water-miscible, aprotic dipolar solvent.

24. The process of claim 23 in which solvent (d) is dimethylformamide.

25. A process of the production of polyurethanes-(ureas) comprising reacting the polyaminohydroxyl compound of claim 1 with a polyisocyanate by a RIM process.

26. The process of claim 25 in which the polyaminohydroxyl compound of claim 7 is used.

27. The process of claim 25 in which the polyaminohydroxyl compound of claim 8 is used.

28. A process for the production of a polyurethane(urea) comprising reacting the mixture of claim 12 with a polyisocyanate by a RIM process.

* * * * *